United States Patent [19]

Fleming et al.

[11] Patent Number: 4,914,149

[45] Date of Patent: * Apr. 3, 1990

[54] FLEXIBLE, CORROSION RESISTANT, THERMOSETTING METAL COATING COMPOSITIONS

[75] Inventors: Kenneth E. Fleming, Edinboro; Douglas H. Mowrey, Erie, both of Pa.

[73] Assignee: Lord Corporation, Erie, Pa.

[*] Notice: The portion of the term of this patent subsequent to Sep. 6, 2005 has been disclaimed.

[21] Appl. No.: 232,208

[22] Filed: Aug. 15, 1988

Related U.S. Application Data

[63] Continuation-in-part of Ser. No. 920,558, Oct. 20, 1986, Pat. No. 4,769,413.

[51] Int. Cl.$^4$ .............................................. C08L 75/00
[52] U.S. Cl. .................................... 524/507; 524/509; 524/511; 524/124
[58] Field of Search .......................... 524/507; 525/124

[56] References Cited

U.S. PATENT DOCUMENTS 4,769,413 9/1988 Fleming et al. ...................... 524/507

Primary Examiner—Joseph L. Schofer
Assistant Examiner—Peter D. Mulcahy
Attorney, Agent, or Firm—Philip P. McCann; James W. Wright

[57] ABSTRACT

A coating composition comprising about 50 to 30% by weight of a blocked isocyanate-functional urethane prepolymer, 2 to 25% by weight of at least one organic solvent-soluble phenolic resin, 0.5 to 18% by weight of a halogenated resin selected from the group consisting of halogenated rubber, halogenated polyolefins and halogenated vinyl halide polymers and an inert solvent in an amount sufficient to provide an adhesive primer having a solid content of 10 to 70% by weight.

15 Claims, No Drawings

FLEXIBLE, CORROSION RESISTANT, THERMOSETTING METAL COATING COMPOSITIONS

This application is a continuation-in-part of application Ser. No. 920,558, filed Oct. 20, 1986 now U.S. Pat. No. 4,769,413.

This invention relates to novel polymeric coating compositions. More particularly, the invention relates to thermosetting coating compositions possessing both flexibility and corrosion resistant properties.

Those industries engaged in the manufacture of articles requiring the application of coatings for protective, decorative or other utilitarian purposes have increasingly turned to coatings that when applied to the article in its preformed condition, withstand the stresses of subsequent article-forming operations. Coating preformed stock is particularly important to those industries engaged in fabricating parts from metal sheet stock such as appliance cabinets, automobile body parts, metal siding, to name just a few. Typically, the coating is applied to a metal coil in a continuous operation offering sizeable advantages to the manufacturer in the overall economics of coating and providing an ability to control the quality of the product not easily available through other coating techniques. Accordingly, coil coating is a preferred approach for coating articles to be manufactured from metal coil or flat stock. However, the development of suitable coating formulations that can be applied as a coil coating, maintain their integrity during metal forming operations and still provide the protection, decorativeness or other required utility is a substantial challenge to those skilled in the art of coating formulation.

The combination of requirements imposed upon the properties of a satisfactory coil coating composition frequently cannot be met with a single formulation. Often, multiple coats of differing compositions are applied sequentially each providing a facet of protection or decorativeness not otherwise achievable in a single formulation. For metals, a primer coating is usually required which provides a stronger adhesive bond passivating corrosion protection, and a barrier between the metal surface and the finished coating layer with which it must also form a strong adhesive bond. Primers for coil coating must also be flexible to accomodate metal forming operations without loss of metal to primer adhesion. But in formulating a primer coating that will possess the above required properties, the formulator must also consider the requirement that the primer must also form a strong adhesive bond with the finish coating and that this adhesive bond must be sufficiently strong to survive the extensive stresses imposed thereon during subsequent metal forming operations. In this sense, the primer and subsequent or finished coats must be highly compatible.

Primer coatings also find considerable utility in what is commonly referred to as tie-coating compositions. Tie-coatings have special use in rubber to metal bonding where the metal substrate is first coated with the primer before it is bonded by adhesive to a rubber or other substrates. Primers which have tie-coating characteristics that enhance the bonding between the metal to the adhesive are highly desirable, especially where they combine this property with those of flexibility and corrosion protection.

The foregoing compositional problems, particularly as regards metal coatings and specifically metal adhesion primers, illustrate the challenge facing workers in the field of coil coating formulation. Metal adhesion primers are known which possess excellent corrosion resistance, but have little flexibility for metals which will be bent in subsequent processing. Others of these primers possess excellent flexibility but lack long term resistance of the bonded assembly to environmental exposure, such as salt spray. Yet others of these primers exhibit less than the desired adhesiveness. The invention described herein is directed to a resolution of the aforementioned problems and constitutes a surprising advancement in the composition of primer coatings, especially metal adhesion primers for coil coating.

A further complication in the formulation of primers and coil coatings is the recent discoveries regarding the need to maintain a manufacturing environment free from chemical agents that may be harmful to a worker's health. For the coil coating industry, new coating formulations must take into account theses environmental constraints and assure that chemical agents thought to be injurious cannot be released into the plant environment as a by-product of the coating process.

It is an object of this invention, therefore, to provide a novel coating composition with both outstanding flexibility and corrosion protection for metals.

Another object of this invention to provide an isocyanate- functional urethane containing coating composition that can be applied in a manner harmonious with the goal of an environmentally safe work place.

A further object of this invention to provide an improved primer coating for coil coating processes.

Yet another object of the invention is to provide a primer useful as a tie-coating in metal to rubber bondings.

These and other objects of the invention are obtained by a coating composition comprising:
  A. about 5 to 30% by weight, preferably 12 to 20% by weight, of blocked urethane prepolymer;
  B. about 2 to 25% by weight, preferably about 8 to 15% by weight, of at least one organic solvent-soluble phenolic resin;
  C. about 0.5 to 18% by weight, preferably about 1.0 to 12% by weight of a halogenated resin selected from the group consisting of halogenated rubber, halogenated polyolefins and halogenated vinyl halide polymers; and
  D. inert solvent in an amount sufficient to provide an adhesive primer having a solids content in the range of about 10 to 70%;

said weight percent of components A, B and C being based on the combined weights of components A, B, C and D.

Optionally, the compositions of the invention may contain fillers, pigments and the like conventional additives.

In another aspect of the invention, adhesive primers which are both flexible and corrosion resistant are formed by simply drying films or coatings of the compositions of the invention.

The blocked urethane prepolymers which are an essential element of the invention are typically prepared by reacting isocyanate-functional urethane prepolymers with substantially any of the known isocyanate blocking agents employing conventional techniques well known in the art.

The isocyanate-functional urethanes which can be employed in the coating compositions of the present invention comprise the reaction product between one or more organic compounds having at least two active hydrogen atoms and a stoichiometric excess of at least one polyisocyanate. Generally, such isocyanate- functional urethanes will be prepared by reacting a polyol, polyether, hydroxyl-terminated polyester, polyester amide, polyamide, or other polyfunctional active hydrogen compound with a diisocyanate or other polyisocyanate having up to eight functional isocyanate groups. Preferred reactants include polyhydroxy polyesters, polyhydroxy polyethers and polyisocyanates having two or three reactive isocyanate groups. An extensive description of some of the useful techniques for preparing isocyanate-functional urethanes can be found in Saunders and Frisch: *Polyurethanes, Chemistry and Technology*, Part II, Interscience (New York 1964), especially at pages 8 to 49, and in the references cited therein. Other preparative techniques which are known in the art can also be employed. Generally, any isocyanate-functional urethane known in the art can be employed in the practice of this invention, with such urethanes having a molecular weight of at least 500, particularly in the range of 1,000 to 10,000, being preferred.

Any of the polyisocyanates having at least two reactive isocyanate groups can be employed in forming isocyanate- functional urethanes suitable for use in the practice of the invention. Such polyisocyanates include, without limitation, aliphatic polyisocyanates such as 1,6-hexamethylene diisocyanate; 1,8-octamethylene diisocyanate; 1,12dodecamethylene diisocyanate; 2,2,4-trimethylhexamethylene diisocyanate; and the like; 3,3'diisocyanatodipropyl ether; 3-isocyanatomethyl-3,5,5'-trimethylcyclohexyl isocyanate; cyclopentalene-1,3-diisocyanate; cyclohexylene-1,4-diisocyanate; methyl 2,6-diisocyanatocaprolate; bis-(2-isocyanatoethyl) -fumarate; 4-methyl-1,3-diisocyanatocyclohexane; trans-vinylene diisocyanate and similar unsaturated polyisocyanates; 4,4'-methylene-bis-(cyclohexylisocyanate) and related polyisocyanates; methane diisocyanates; bis-(2-isocyanatoethyl) carbonate and similar carbonate polyisocyanates; N,N'N"'-tris-(6-isocyanatohexamethylene) biuret and related polyisocyanates; as well as other known polyisocyanates derived from aliphatic polyamines; aromatic polyisocyanates such as toluene diisocyanates; xylene diisocyanates; dianisidine diisocyanate; 4,4'diphenylmethane diisocyanate; 1-ethoxy-2,4-diisocyanatobenzene; 1-chloro-2,4-diisocyanatobenzene; tris(4-isocyanatophenyl) methane; naphthalene diisocyanates; 4,4'-biphenyl diisocyanate; phenylene diisocyanates; 3,3'-dimethyl-4,4'-biphenyl diisocyanate; p-isocyanatobenzoyl isocyanates; tetrachloro-1,3-phenylene diisocyanate; and the like.

At the present time, the preferred isocyanatefunctional urethanes are the reaction products of polycaprolactones and toluene diisocyanate.

In forming the blocked urethanes, the isocyanate-functional urethanes can be blocked employing conventional techniques with any of the known blocking agents, including, without limitation, monohydroxy compounds such as aliphatic and aromatic monoalcohols, e.g., methanol, ethanol, isopropanol, phenol, and the like; or any compound containing enolizable hydrogen, such as acetoacetate ester, diethyl malonate, ethyl benzoyl malonate, acetyl acetone, acetynol acetone, and the like. Preferred blocking agent include hydroxy, oxime, and ketoxime blocking agents, such as acetophenone oxime, butyraldoxime, acetone oxime, 2-butanone oxime, 3-methyl-2-butanone oxime, 3-pentanone oxime, 4-methyl-2-pentanone oxime, cyclohexanone oxime, methyl ethyl ketoxime, methyl methyl ketoxime, and the like. It is preferred to employ the blocking agent in a ratio of equivalents by weight of active isocyanate functions to blocking agent in a range from about 1:1 to about 1:4. Of course, mixtures of the different blocking agents, as well as two or more different isocyanate-functional urethanes, can be used.

As the phenolic resin there can be employed the organic solvent-soluble heat-reactive condensation product of an aldehyde having from 1 to 8 carbon atoms, such as formaldehyde, acetaldehyde, isobutyraldehyde, ethylhexaldehyde, and the like, with phenolic compounds such as phenol, o-cresol, m-cresol, p-cresol, mixed cresols, e.g., cresylic acid and m-cresol and/or p-cresol, xylenol, diphenylolpropane, p-butylphenol, p-tert-amylphenol, p-octylphenol, p,p'-dihydroxydiphenylether, and the like. Mixtures of dissimilar phenolic resins can be used. Presently preferred are mixtures of phenol formaldehyde resin and phenol formaldehyde resin modified with a cresol.

The phenolic resin will preferably be formed in a conventional manner from the condensation of from about 0.8 to about 5 mols of aldehyde per mol of phenolic compound in the presence of basic, neutral or acidic catalysts to afford an organic solvent-soluble resin having a molecular weight in the range from about 300 to about 2,000, preferably about 300 to about 1,200. The phenolic resin is preferably compatible with the blocked polyurethane component, and hence it is important that the phenolic resin be soluble in an inert organic solvent system which is compatible with the blocked polyurethane component.

The halogenated resin component of the invention can be either a halogenated natural or synthetic material. Generally, the halogenated resins have an inherent viscosity above 100 centipoise at 20% concentration in toluene and a halogen content of 58 to 68% by weight. The polymers are preferably halogenated with chlorine but bromine and fluorine can be used as well.

Examples of suitable halogenated synthetic rubbers are halogenated polymers selected from dienes having 4 to 8 carbon atoms such as halogenated polybutadiene, halogenated polyisoprene, halogenated polyhexadiene and the like. The preferred halogenated polydiene is chlorinated polyisoprene. Halogenated articles are well known articles of commerce and need not be discussed here in detail.

The halogenated polyolefins include, for example, halogenated polyethylene, halogenated polypropylene and halogenated polybutylene as well as halogenated copolymers of dissimilar alpha-olefins of 2 to 8 carbon atoms. The preferred halogenated polyolefins are chlorinated polyethylene and chlorinated polypropylene.

The halogenated vinyl halide polymers include halogenated homopolymers or copolymers of vinyl halide. These halogenated materials can be made by post-halogenating the vinyl-halide resin, preferably by post-chlorinating polyvinylchloride. Such materials are commercially available and include, for instance, Genchlor S and Genchlor T, manufactured by Imperial Chemical Industries, Ltd.

The novel coating compositions of the present invention comprised of the phenolic resin, the blocked isocyanate-functional urethane and the halogenated rubber may be preblended for subsequent dissolution in a substantially anhydrous organic solvent medium. In most instances, however, the components are all simultaneously dissolved in the organic solvent to prepare a coating composition ready for application. Any non-reactive volatile, mutual or compatible solvent for the resinous components may be used, such as ethylene dichloride, trichloroethylene, and the like, including mixed solvent systems comprising ketones, hydrocarbons, esters and the like. In selecting the blocked urethane, phenolic resin and solvent system, it is an important criterion that the selected ingredients be sufficiently compatible so as to form an essentially homogeneous admixture. The solvent system will generally be present in an amount sufficient to provide an admixture of resinous components in solvent at a total solids content in the range from about 10 to about 70, preferably from about 25 to about 65, percent.

As previously noted, the compositions of the invention can include conventional additives such as pigments, fillers, and the like; with such additives being used in conventional amounts. Particularly preferred additives include titanium dioxide, zinc oxide and carbon black and fillers such as silica.

The novel coating compositions of the invention can be applied to a variety of substrates including steel, stainless steel, aluminum, zinc, and other metals by conventional techniques of brushing, spraying, flow-coating, dip-coating, roller-coating, or electrodeposition. After the coating is applied, coatings having excellent flexibility and corrosion resistance as well as other desired properties such as ready reception to overcoats and in particular to adhesives such as are used in metal to rubber bonding are obtained by drying the coating at an elevated temperature sufficient to drive off the solvent. In all instances, the drying operation is conducted under time and temperature conditions which do not cause significant dissociation of the blocked urethane prepolymer. Otherwise, the dryings cycles may vary over a wide range of time and temperature to suit the coating as well as manufacturing constraints which may be imposed upon the process for other reasons. Typical drying temperatures fall in the range of about 350° to 425° F. peak metal temperature.

The following examples are included to further describe the invention.

EXAMPLE I

A primer composition was prepared according to the following recipe:

| Ingredient | Wt. % of Total |
|---|---|
| 1. Ketoxime-blocked isocyanate-functional urethane[a] | 15.0 |
| 2. Chlorinated rubber[b] | 7.05 |
| 3. Phenol formaldehyde, approx. 37% methylol @ 70% TSC | 5.73 |
| 4. Phenol formaldehyde resin modified with 12.5% orthocresol @70% TSC | 5.0 |
| 5. Carbon Black | 0.73 |
| 6. Silica | 1.25 |
| 7. TiO$_2$ | 4.44 |
| 8. Zinc oxide | 0.70 |
| 9. Xylene | 18.15 |
| 10. Methyl Isobutyl Ketone | 41.95 |

[a]An isocyanate-terminated urethane having a molecular weight of 3000 prepared from polycaprolactone and toluene, blocked in a conventional manner using a slight excess of methyl ethyl ketoxime.
[b]Chlorinated polyisoprene rubber (approx. 64% Cl).

The ingredients were combined in a conventional manner by high shear mixing with the temperature being maintained below 55° C. to obtain a homogeneous fluid. The thus-prepared primer composition was coated onto aluminum coil stock (treated with a pre-paint conversion coating), dried to a peak metal temperature of 200° C. and cooled to provide a coating having a dry film thickness of 0.15 mil. The thus-coated aluminum stock was divided into two groups.

One group was subjected to the T-bends test per National Coil Coaters Association Test No. II-19. The T-bends results were 0 or 1, indicating excellent adhesion and flexibility.

The other group was bonded to styrene/butadiene rubber (SBR) with a convention rubber to metal adhesive to form rubber to aluminum assemblies. The assemblies were subjected to the 7 days salt spray test (ASTM B 117) to test the primer for resistance to corrosion. Bond results were excellent, i.e., 90–100% rubber retention.

The coating compositions prepared in the following example were subject to the T-bends test described above and also to the following tests: Slit/bend and Rubber peel test.

Slit/bend Test

The purpose of the test is to determine the extent of adhesion when a metal substrate is first coated with a primer before it is bonded by a conventional adhesive to a layer of rubber so as to form a rubber to metal assembly which is then cured. After the cure cycle is completed, a razor blade is used to cut through the rubber layer to the metal. The assembly is then bent 180° at the slit. If on bending, only the razor slit exposes the metal, the primer passes the test. On the other hand, if on bending, more metal is exposed than that exposed by the slit, the primer fails.

Rubber Peel Test

This is another test for evaluating the adhesive strength of primer coated on a metal substrate to which a layer of rubber is subsequently bonded by a conventional adhesive. After the cure cycle, the coated metal/rubber assembly is water-quenched to rapidly cool the test part. The peel test is then carried out by peeling the rubber off the metal substrate using a pair of needle nose pliers. If rubber is retained on the surface of the metal substrate, the bond is considered very good. If adhesive or metal is exposed, the bond is poor.

EXAMPLE II

Primer compositions were prepared according to the following recipes:

| | A | | B | | C | |
|---|---|---|---|---|---|---|
| | Dry | Wet | Dry | Wet | Dry | Wet |
| 1. Chlorinated rubber[b] (Cl R) | 7.05 | 7.03 | 1.0 | 1.0 | 2.06 | 2.06 |
| 2. Phenol formaldehyde, approx. 37% methylol at 70% TSC | 4.01 | 5.73 | 5.0 | 7.14 | 5.31 | 7.58 |
| 3. Phenol formaldehyde resin modified with 12.5% orthocresol at 70% TSC | 3.5 | 5.00 | 5.0 | 7.14 | 5.31 | 7.58 |
| 4. Carbon Black | .73 | .73 | 1.0 | 1.0 | .97 | .97 |
| 5. Silica | 1.25 | 1.25 | 1.8 | 1.8 | 1.65 | 1.65 |
| 6. TiO$_2$ | 4.43 | 4.44 | 6.4 | 6.4 | 5.88 | 5.88 |
| 7. Zinc Oxide | .7 | .7 | 1.0 | 1.0 | .92 | .92 |
| 8. Ketomime-blocked isocyanate-functional urethane[a] (BL U) | 12.3 | 15.0 | 11.8 | 14.5 | 10.9 | 13.3 |

-continued

| | A | | B | | C | |
|---|---|---|---|---|---|---|
| | Dry | Wet | Dry | Wet | Dry | Wet |
| 9. Xylene | — | 18.15 | — | 12.0 | — | 10.52 |
| 10. Methyl Isobutyl Ketone | — | 41.95 | — | 48.02 | — | 49.54 |

Calculations of % Cl R and Bl U:

A: % Cl R
100.0 (wet wt.) − 7.11 (pigments) = 92.89
7.03 (Cl R)/92.89 = .075
.075 × 100 = 7.5% Cl R A: % Blocked Urethane
12.3 (Bl U)/92.89 = .132
.132 × 100 = 13.2% Bl U B: % Cl R
100.0 (wet Wt.) − 10.2 (pigments) = 89.8
1.0 (CL R)/89.8 = .011
.011 × 100 = 1.1% Cl R B: % Blocked Urethane
11.8 (Bl U)/89.8 = .131
.131 × 100 = 13.1% Bl U C: % Cl R
100.0 (wet wt.) − 9.42 (pigments) = 90.58
2.06 (Cl R)/90.58 = .0227
.0227 × 100 = 2.27% Cl R C: % Blocked Urethane
10.9 (Bl U)/90.58 = .120
.120 × 100 = 12% Bl U (a)An isocyanate-terminated urethane having a molecular weight of 3000 prepared from polycaprolactone and toluene, blocked in a conventional manner using a slight excess of methyl ethyl ketoxime.
(b)Chlorinated polyisoprene rubber (approx. 64% Cl.).

Each of the above coating compositions were subjected to the T-bends test.

In addition, the above primers were coated on electrogalvanized steel panels and a EPDM rubber layer was bonded onto the coated panels with a conventional rubber to metal adhesive designated "D" to form rubber to galvanized steel assemblies. The resulting assemblies were cured at a cure cycle of 5 minutes at 450° F. followed by a water quench. The resulting assemblies were then subjected to the slit/bend and rubber peel test. The results of the tests were as follows:

| | T-bends | Slit/bend | % R* |
|---|---|---|---|
| A | 0 | — | — |
| B | 0 | — | — |
| C | 0 | — | — |
| A/D | — | Pass | 100% |
| B/D | — | Pass | 100% |
| C/D | — | Pass | 100% |

*percent rubber retention

As can be seen, the results of the T-bends test, slit/bend test and rubber peel test were excellent.

It is claimed:

1. A coating composition comprising
   A. about 5 to 30% by weight of blocked isocyanate-functional urethane prepolymer;
   B. about 2 to 25% by weight of at least one organic solvent-soluble phenolic resin;
   C. about 0.5 to 18% by weight of a halogenated resin selected from the group consisting of halogenated rubber, halogenated polyolefins and halogenated vinyl halide polymers; and
   D. inert solvent in an amount sufficient to provide an adhesive primer having a solids content in the range of about 10 to 70%;
   said weight percent of components A, B and C being based on the combined weights of components A, B, C and D.

2. A coating composition according to claim 1 wherein said blocked urethane prepolymer is a ketoxime-blocked, isocyanate-functional urethane.

3. A coating composition according to claim 2 wherein the isocyanate-functional urethane is prepared by reaction of a polyester polyol and a diisocyanate.

4. A coating composition according to claim 3 wherein the isocyanate-functional urethane is prepared by reaction of a polycaprolactone and toluene diisocyanate.

5. A coating composition according to claim 1 wherein the phenolic resin comprises the reaction product of at least one aromatic hydroxy compound and an aldehyde having from 1 to 8 carbon atoms.

6. A coating composition according to claim 5 wherein the hydroxy compound is phenol.

7. A coating composition according to claim 1 wherein said phenolic resin comprises a mixture of phenol formaldehyde resin and a phenol-formaldehyde resin modified with 10 to 20% cresol.

8. A coating composition according to claim 1 wherein the halogenated resin is halogenated rubber.

9. A coating composition according to claim 8 wherein the halogenated rubber is a halogenated polydiene.

10. A coating composition according to claim 9 wherein the halogenated polydiene is a halogenated polymer of a diene of 4 to 8 carbon atoms.

11. A coating composition according to claim 9 wherein the halogenated polydiene is chlorinated polydiene.

12. A coating composition according to claim 11 wherein the chlorinated polydiene is chlorinated isoprene.

13. A coating composition according to claim 1 wherein the halogenated resin is a halogenated vinyl halide polymer.

14. A coating composition according to claim 13 wherein the halogenated vinyl halide polymer is post-chlorinated polyvinyl chloride.

15. The coating composition of claim 1, comprising
   A. about 12 to 20% by weight of the blocked isocyanate-functional urethane prepolymer;
   B. about 8 to 15% by weight of the organic solvent-soluble phenolic resin; and
   C. about 1 to 12% by weight of the halogenated resin.

* * * * *